United States Patent
Terry et al.

(10) Patent No.: US 9,203,651 B2
(45) Date of Patent: Dec. 1, 2015

(54) SORTING SYSTEMS IN A TREE (75) Inventors: David G. Terry, Nashua, NH (US); Masabumi Koinuma, Waltham, MA (US); Timothy Lloyd Land, Moorpark, CA (US); James N. Paterson, Thousand Oaks, CA (US); Tao Sun, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 853 days.

(21) Appl. No.: 12/475,820

(22) Filed: Jun. 1, 2009

(65) Prior Publication Data

US 2010/0306364 A1  Dec. 2, 2010

(51) Int. Cl.
*G06F 15/173* (2006.01)
*H04L 12/66* (2006.01)
*G06F 17/30* (2006.01)

(52) U.S. Cl.
CPC .......... *H04L 12/66* (2013.01); *G06F 17/30961* (2013.01)

(58) Field of Classification Search
CPC .......... G06F 17/30961; H04L 12/66

USPC ......................................................... 709/224
See application file for complete search history.

(56) References Cited

U.S. PATENT DOCUMENTS

| 7,032,186 | B1* | 4/2006 | Gasser et al. ................ 715/853 |
| 7,203,701 | B1* | 4/2007 | Packebush et al. .................. 1/1 |
| 2003/0018643 | A1* | 1/2003 | Mi et al. .......................... 707/10 |
| 2003/0065986 | A1* | 4/2003 | Fraenkel et al. ................ 714/47 |
| 2005/0114795 | A1* | 5/2005 | Beaudoin ...................... 715/854 |
| 2006/0059428 | A1* | 3/2006 | Humphries et al. .......... 715/734 |
| 2006/0277231 | A1* | 12/2006 | Kral et al. ..................... 708/102 |
| 2007/0011179 | A1* | 1/2007 | Paval ............................ 707/100 |
| 2008/0052623 | A1* | 2/2008 | Gutfleisch .................... 715/713 |
| 2010/0153881 | A1* | 6/2010 | Dinn ............................ 715/825 |

* cited by examiner

*Primary Examiner* — Joseph Greene
(74) *Attorney, Agent, or Firm* — Holland & Knight LLP; Brian J. Colandreo, Esq.; Jeffrey T. Placker, Esq.

(57) ABSTRACT

A method, computer program product, and computing system for monitoring, via a monitoring server, attributes of computer systems in communication with the monitoring server. A graphical user interface may display selectable attributes of the computer systems monitored by the monitoring server. The computer systems may be sorted in a tree based upon, at least in part, one or more selected attributes of the computer systems monitored by the monitoring server.

20 Claims, 6 Drawing Sheets

SORTING SYSTEMS IN A TREE

BACKGROUND OF THE INVENTION

This disclosure relates to sorting systems in a tree and, more particularly, to methodologies for sorting computer systems in a tree based upon, at least in part, one or more selected attributes of the computer systems.

Some trees or other hierarchical systems for displaying objects, such as computer systems may allow users to sort computer systems by hostname, or internet protocol (IP) address. In trees showing many computer systems in communication with each other, on the same network, in distributed/host environments or owned and/or used by the same entity (i.e., a corporation), the computer systems may be sorted by a hardcoded characteristic (e.g., hostname or IP address). Often times, this sorting structure is not helpful to the user. The user may wish for the tree to sort the computer systems based on a different characteristic, or a number of different characteristics.

Additionally, while the tree may sort computer systems based on one characteristic, the values of many other characteristics may be gathered, or may otherwise be available at the user's system. The user may wish for the tree to sort the computer systems based on one or more of these characteristics and their values, which may change at any time. Accordingly, the user may require an application allowing the user to sort the computer systems in a tree based on one or more user-specified characteristics, or attributes, the values of which may be available to the user's system.

BRIEF SUMMARY OF THE INVENTION

In a first implementation, a computer implemented method may comprise monitoring, via a monitoring server, attributes of computer systems in communication with the monitoring server. The computer implemented method may also comprise displaying, in a graphical user interface, selectable attributes of the computer systems monitored by the monitoring server. The computer implemented method may further comprise sorting the computer systems in a tree based upon, at least in part, one or more selected attributes of the computer systems monitored by the monitoring server.

One or more of the following features may be included. One or more definable priority levels for the one or more selected attributes of the computer systems monitored by the monitoring server may be displayed via the graphical user interface. The computer systems in the tree may be sorted, based upon, at least in part, one or more defined priority levels of the one or more selected attributes of the computer systems monitored by the monitoring server. Further, code may be generated, via the monitoring server, to sort the computer systems in the tree based upon, at least in part, at least one of the selected attributes of the computer systems monitored by the monitoring server. Additionally, code may be generated, via the monitoring server, to sort the computer systems in the tree based upon, at least in part, at least one of the defined priority levels of at least one of the selected attributes of the computer systems monitored by the monitoring server.

In some implementations, a sorting configuration of the one or more defined priority levels of the one or more selected attributes of the computer systems monitored by the monitoring server may be saved. Furthermore, the computer systems in the tree may be sorted based upon, at least in part, the saved sorting configuration. The tree may be updated based upon, at least in part, changes in the selected attributes of the computer systems. Additionally, events triggered by changes in the selected attributes of the computer systems may be monitored. The tree may be updated based upon, at least in part, the events.

In another implementation, a computer program product may reside on a computer readable medium and have a plurality of instructions stored on it. When executed by a processor, the instructions may cause the processor to perform operations comprising monitoring, via a monitoring server, attributes of computer systems in communication with the monitoring server. The computer program product may also comprise displaying, in a graphical user interface, selectable attributes of the computer systems monitored by the monitoring server. The computer program product may further comprise sorting the computer systems in a tree based upon, at least in part, one or more selected attributes of the computer systems monitored by the monitoring server.

One or more of the following features may be included. One or more definable priority levels for the one or more selected attributes of the computer systems monitored by the monitoring server may be displayed via the graphical user interface. The computer systems in the tree may be sorted, based upon, at least in part, one or more defined priority levels of the one or more selected attributes of the computer systems monitored by the monitoring server. Further, code may be generated, via the monitoring server, to sort the computer systems in the tree based upon, at least in part, at least one of the selected attributes of the computer systems monitored by the monitoring server. Additionally, code may be generated, via the monitoring server, to sort the computer systems in the tree based upon, at least in part, at least one of the defined priority levels of at least one of the selected attributes of the computer systems monitored by the monitoring server.

In some implementations, a sorting configuration of the one or more defined priority levels of the one or more selected attributes of the computer systems monitored by the monitoring server may be saved. Furthermore, the computer systems in the tree may be sorted based upon, at least in part, the saved sorting configuration. The tree may be updated based upon, at least in part, changes in the selected attributes of the computer systems. Additionally, events triggered by changes in the selected attributes of the computer systems may be monitored. The tree may be updated based upon, at least in part, the events.

In another implementation, a computing system is provided. The computing system may include at least one processor and at least one memory architecture coupled with the at least one processor. The computing system may also include a first software module executed on the at least one processor and the at least one memory architecture, wherein the first software module is configured to monitor, via a monitoring server, attributes of computer systems in communication with the monitoring server. Further, the computing system may include a second software module configured to display, in a graphical user interface, selectable attributes of the computer systems monitored by the monitoring server. Additionally, the computing system may include a third software module configured to sort the computer systems in a tree based upon, at least in part, one or more selected attributes of the computer systems monitored by the monitoring server.

One or more of the following features may be included. A fourth software module may be configured to display, via the graphical user interface, one or more definable priority levels for the one or more selected attributes of the computer systems monitored by the monitoring server. A fifth software module may be configured to sort the computer systems in the tree based upon, at least in part, one or more defined priority levels of the one or more selected attributes of the computer systems monitored by the monitoring server. A sixth software module may be configured to generate code, via the monitoring server, to sort the computer systems in the tree based upon, at least in part, at least one of the selected attributes of the computer systems monitored by the monitoring server. Moreover a seventh software module may be configured to generate code, via the monitoring server, to sort the computer systems in the tree based upon, at least in part, at least one of the defined priority levels of at least one of the selected attributes of the computer systems monitored by the monitoring server.

In some implementations, an eighth software module may be configured to save a sorting configuration of the one or more defined priority levels of the one or more selected attributes of the computer systems monitored by the monitoring server. A ninth software module may be configured to sort the computer systems in the tree based upon, at least in part, the saved sorting configuration. Further, a tenth software module may be configured to update the tree based upon, at least in part, changes in the selected attributes of the computer systems.

The details of one or more implementations are set forth in the accompanying drawings and the description below. Other features and advantages will become apparent from the description, the drawings, and the claims.

DETAILED DESCRIPTION OF THE INVENTION

Referring to FIGS. 1-5, there is shown tree-sorting process 10. As will be discussed below, tree-sorting process 10 may monitor 100, via a monitoring server (e.g., server 20) attributes 202 of computer systems 28-1-28-*n* in communication with monitoring server 20. Tree-sorting process 10 may display 102, in graphical user interface 200, selectable attributes 204 of computer systems 28-1-28-*n* monitored by monitoring server 20. Further, tree-sorting process 10 may sort 104 computer systems 28-1-28-*n* in tree 300 based upon, at least in part, one or more selected attributes 206 of computer systems 28-1-28-*n* monitored by the monitoring server 20.

Figure 1:
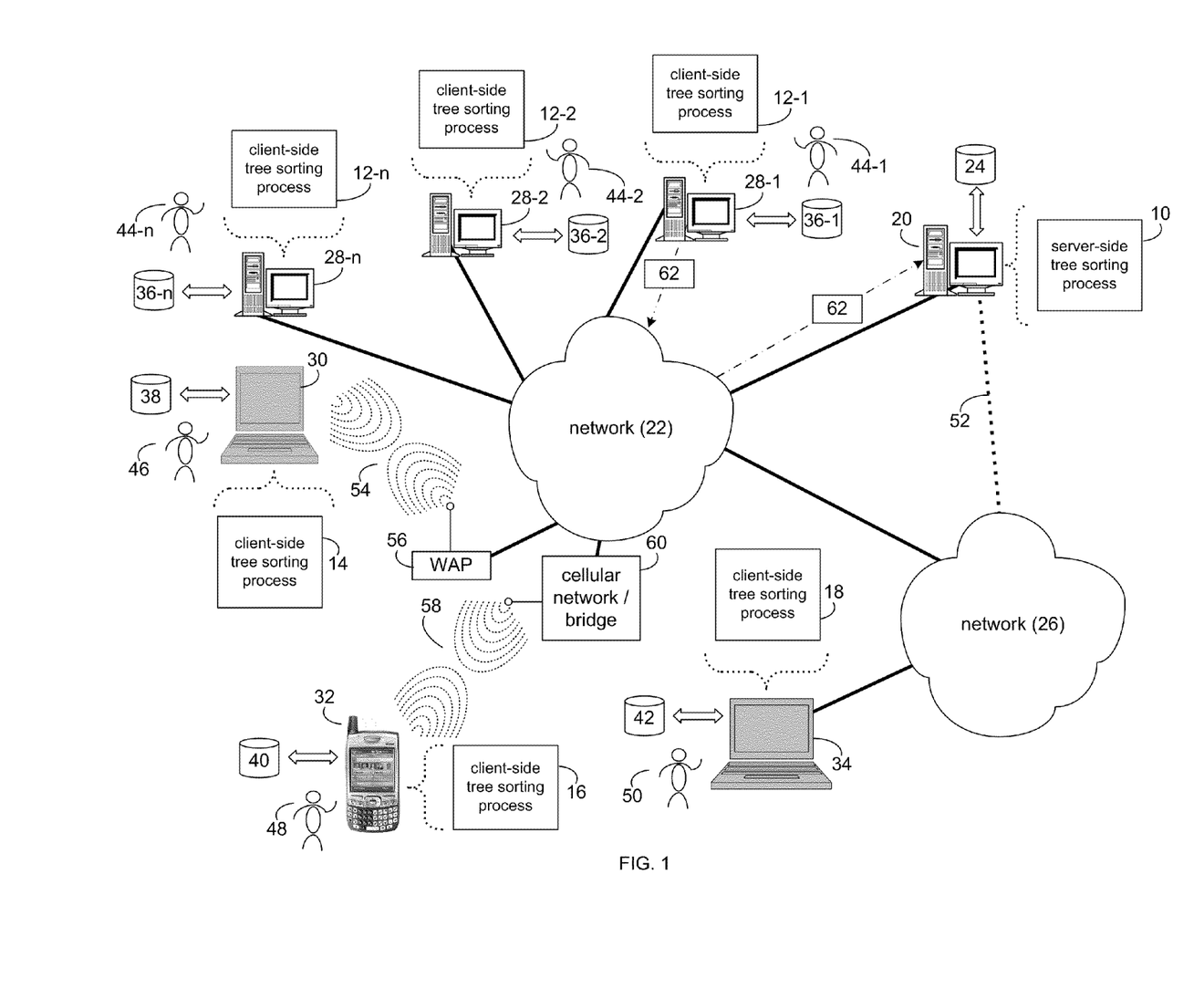
FIG. 1 is a diagrammatic view of a tree-sorting process coupled to a distributed computing network.

The tree-sorting process may be a server-side process (e.g., server-side tree-sorting process 10), a client-side process (e.g., client-side tree-sorting processes 12-1-12-*n*, client-side tree-sorting process 14, client-side tree-sorting process 16, or client-side tree-sorting process 18), or a hybrid server-side/client-side process (e.g., the combination of server-side tree-sorting process 10 and one or more of client-side tree-sorting processes 12-1-12-*n*, 14, 16, or 18).

Server-side tree-sorting process 10 may reside on and may be executed by server computer 20 which may also be the monitoring server and which may be connected to network 22 (e.g., the Internet or a local area network). Examples of server computer 20 may include, but are not limited to: a personal computer, a server computer, a series of server computers, a mini computer, and a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side tree process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for access to server computer 20 (via network 22) using one or more protocols, examples of which may include but are not limited to HTTP (i.e., HyperText Transfer Protocol), SIP (i.e., session initiation protocol), and the Lotus Sametime™ VP protocol. Network 22 may be connected to one or more secondary networks (e.g., network 26), examples of which may include but are not limited to: a local area network; a wide area network; or an intranet, for example.

Client-side tree-sorting processes 12-1-12-*n*, 14, 16, 18 may reside on and may be executed by client electronic devices 28-1-28-*n*, 30, 32, 34 (respectively), examples of which may include but are not limited to personal computers 28-1-28-*n*, laptop computer 30, personal digital assistant 32, notebook computer 34, a data-enabled, cellular telephone (not shown), and a dedicated network device (not shown), for example. Client electronic devices 28-1-28-*n*, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side tree-sorting processes 12-1-12-*n*, 14, 16, 18, which may be stored on storage devices 36-1-36-*n*, 38, 40, 42 (respectively) coupled to client electronic devices 28-1-28-*n*, 30, 32, 34 (respectively), may be executed by one or more processors (not shown) and one or more memory architectures (not shown) incorporated into client electronic devices 28-1-28-*n*, 30, 32, 34 (respectively). Storage devices 36-1-36-*n*, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Examples of client-side tree-sorting processes 12-1-12-*n*, 14, 16, 18 may include but are not limited to a process incorporated into and executed within a client-side operating system (e.g., Microsoft Windows™, Linux™, Unix, and Mac OS™), client-side system monitoring software (e.g., IBM Tivoli Monitoring™), or client-side software configuration management system (e.g., IBM Rational ClearCase™) Examples of server-side tree-sorting process 10 may include but are not limited to a process incorporated into and executed within a server-side operating system (e.g., Microsoft Windows™, Linux™, Unix, and Mac OS™), server-side system monitoring software (e.g., IBM Tivoli Monitoring™), or server-side software configuration management system (e.g., IBM Rational ClearCase™) Alternatively, client-side tree-sorting processes 12-1-12-n, 14, 16, 18 and/or server-side tree-sorting process 10 may be stand-alone applications that work in conjunction with (i.e., interface with) a client-side operating system, system monitoring software, or software configuration management system and/or a server-side operating system, system monitoring software, or software configuration management system (respectively). One or more of client-side tree-sorting processes 12-1-12-n, 14, 16, 18 and server-side tree-sorting process 10 may interface with each other (via network 22 and/or network 26) to allow a plurality of users (e.g., user 44-1-44-n, 46, 48, 50) to transmit tree-sorting configurations (e.g., tree-sorting configuration 212) to each other.

Users 44-1-44-n, 46, 48, 50 may access server-side tree-sorting process 10 directly through the device on which the client-side tree-sorting process (e.g., client-side tree-sorting processes 12-1-12-n, 14, 16, 18) is executed, namely client electronic devices 28-1-28-n, 30, 32, 34, for example. Users 44-1-44-n, 46, 48, 50 may access server-side tree-sorting process 10 directly through network 22 and/or through secondary network 26. Further, server computer 20 (i.e., the computer that executes server-side tree-sorting process 10, which may also be monitoring server 20) may be connected to network 22 through secondary network 26, as illustrated with phantom link line 52.

The various client electronic devices may be directly or indirectly coupled to network 22 (or network 26). For example, personal computers 28-1-28-n (which may be computer systems 28-1-28-n) are shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Personal digital assistant 32 is shown wirelessly coupled to network 22 via wireless communication channel 58 established between personal digital assistant 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Tree-Sorting Process

For the following discussion, server-side tree-sorting process 10 will be described for illustrative purposes. Server-side tree-sorting process 10 may be a process incorporated into and executed within a server-side operating system (e.g., Microsoft Windows™, Linux™, Unix, and Mac OS™), server-side system monitoring software (e.g., IBM Tivoli Monitoring™), or server-side software configuration management system (e.g., IBM Rational ClearCase™) However, this is not intended to be a limitation of this disclosure, as other configurations are possible (e.g., client-side tree-sorting processes and/or hybrid tree-sorting processes.) For example, some implementations may include one or more of client-side tree-sorting processes 12-1-12-n, 14, 16, 18 in place of or in addition to server-side tree-sorting process 10.

Server-side tree-sorting process 10 may automatically detect, via monitoring server 20, computer systems 28-1-28-n on network 22 and construct a globally accessible hierarchical tree. The tree may be created and maintained programmatically by using data collected from computer systems 28-1-28-n in real-time. Computer systems 28-1-28-n may be globally-deployed hosts and may be organized into higher level grouping nodes based on software configuration management (SCM) criteria. Each node of the tree may have attached to it a number of tables and charts stored in a memory (e.g., storage device 24) to display detailed information about computer systems 28-1-28-n. Server-side tree-sorting process 10 may use the information in these tables and/or charts to sort the tree. Since server-side tree-sorting process 10 collects data (i.e., system attributes) from all computer systems and/or servers on the network (e.g., network 22), the tree may provide a central point to view the entire network in a hierarchical structure in a real-time fashion. Further, the tree may be updated if a computer system and/or server and/or host is added, removed, or changes in location or site.

As used herein, the term "tree" may be a graphical user interface and/or display showing a hierarchical relationship between objects in a system. A "tree" may show relationships or hierarchies between nodes, networks, sub-networks, systems, sub-systems, servers, computer systems, and client electronic devices in a larger system and/or larger network. The order of the objects shown in the tree may be based upon, at least in part, attributes of the objects. For example, this disclosure relates to sorting computer systems in a tree, and therefore trees discussed throughout this disclosure may sort computer systems in a network based upon, at least in part, attributes of the computer systems.

Figure 4:
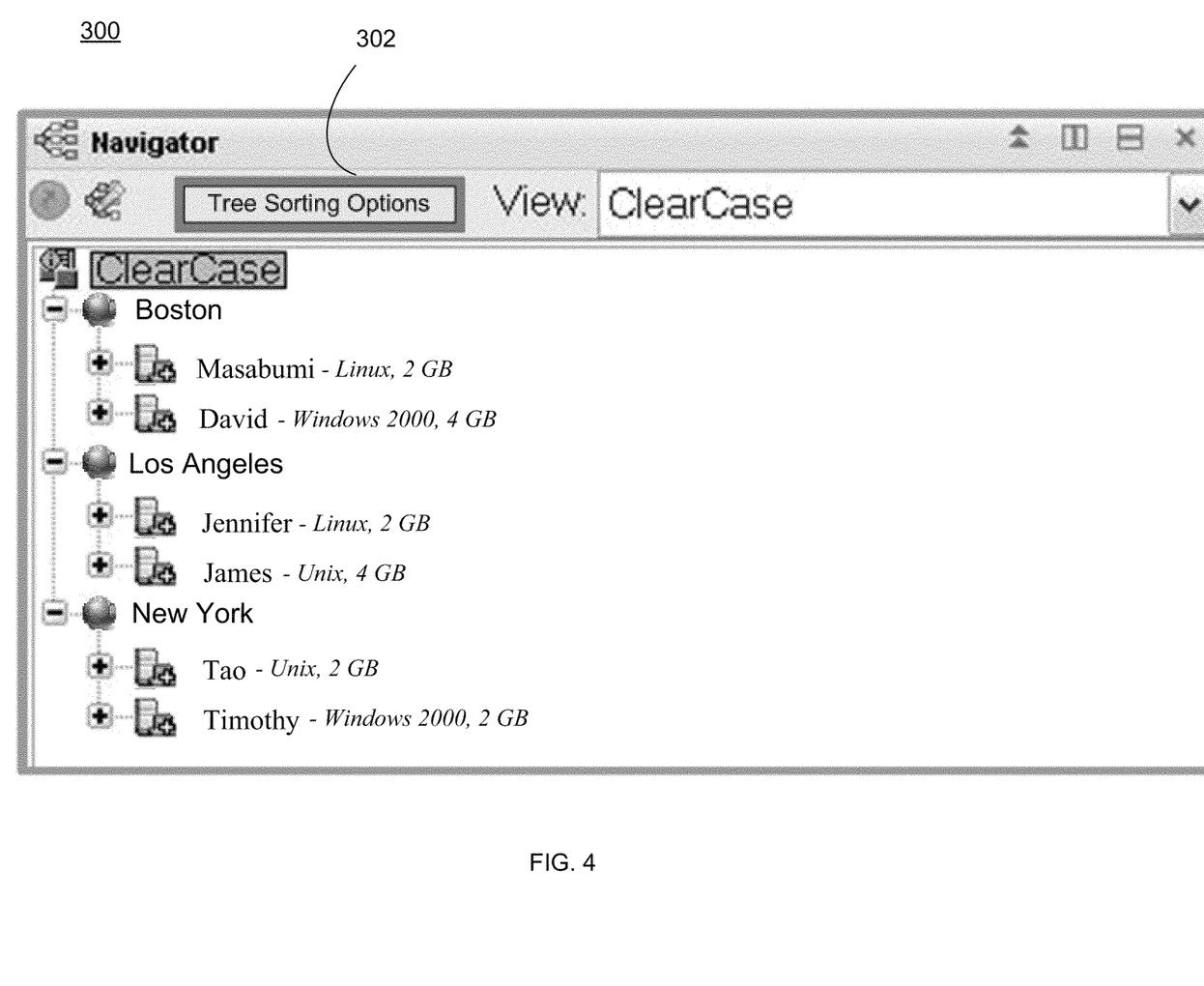
FIG. 4 is a diagrammatic view of a tree rendered, at least in part, by the tree-sorting process of FIG. 1.

Server-side tree-sorting process 10 and the tree (e.g. tree 300) may offer a number of tables and/or charts for each node (i.e., each location, site, region, sub-network or each computer system). These tables and/or charts may be stored in a memory (e.g., storage device 24) and may be accessible by the user via the tree (e.g., tree 300) to allow the user to view all the information (including but not limited to the information mentioned below) on each computer system collected by server-side tree-sorting process 10.

Further, server-side tree-sorting process 10 may construct the tree by first adding a root node. The root node may represent one aspect of the network or the systems deployed. Server-side tree-sorting process 10 may then collect a list of computer systems in the network and/or deployment. Next, and as will be discussed below, server-side tree-sorting process 10 may use one or more attributes, which may be one or more selected and prioritized attributes, to group the computer systems (e.g., computer systems 28-1-28-n). Server-side tree-sorting process 10 may run a query against each computer system in the network and/or deployment for each selected attribute. For each selected attribute, server-side tree-sorting process 10 may read the attribute value of the computer system and find a node in the tree matching the value of the attribute. If the value of the attribute does not exist (i.e., no computer system in the tree has that value for the attribute), the computer system having that value may be added under the node, or if there are no other computer systems having the attribute, the computer system may become the root node. Moreover, server-side tree-sorting process 10 may update or synchronize the tree as values of attributes of the computer systems in the network and/or deployment change.

Figure 2:
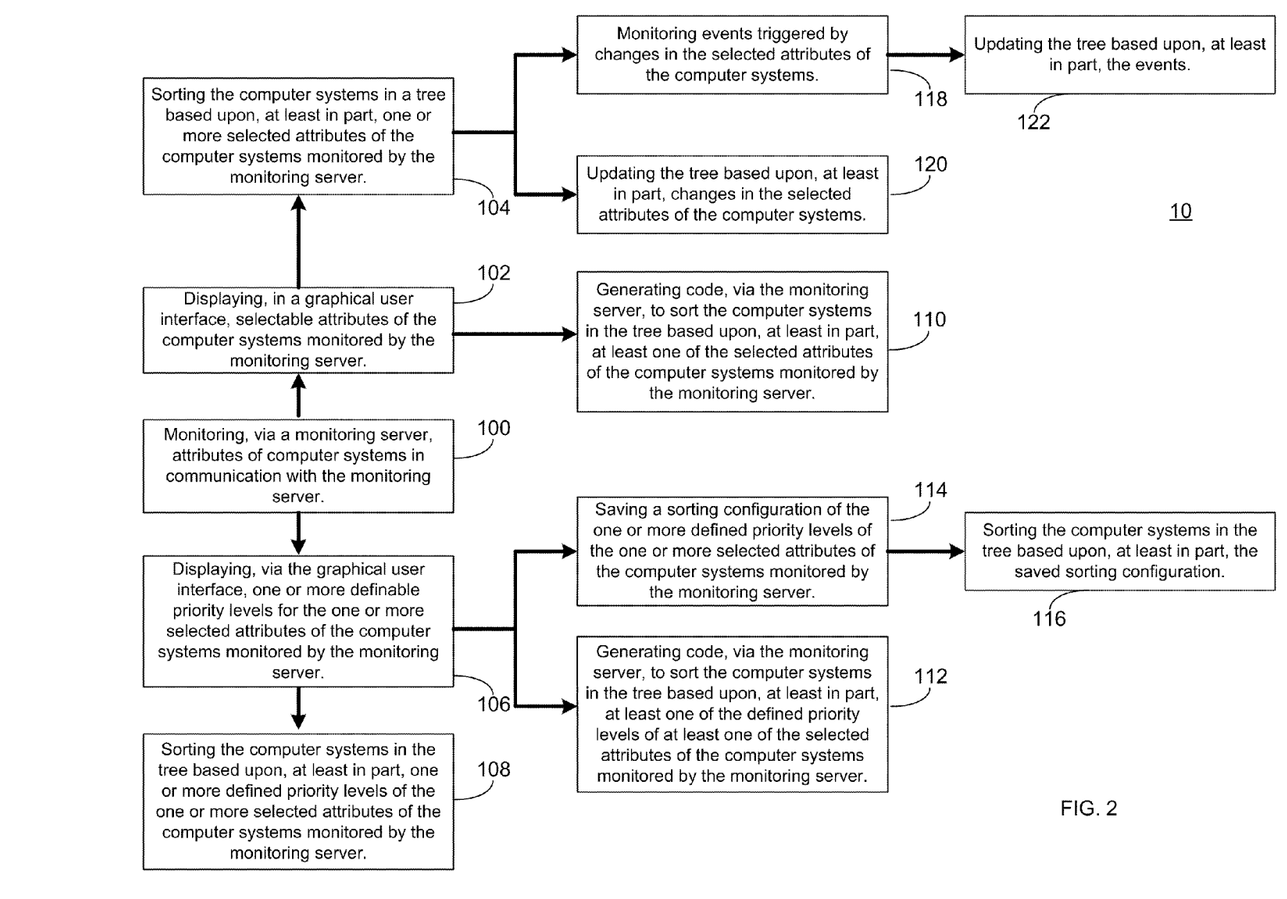
FIG. 2 is a flowchart of the tree-sorting process of FIG. 1.

Referring to FIGS. 1 & 2, server-side tree-sorting process 10 may monitor 100, via monitoring server 20 (i.e., server computer 20), attributes 202 of computer systems 28-1-28-n in communication with monitoring server 20. Monitoring server 20 may be, for example, one or more of an application server, communication server, database server, file server, proxy server, web server, view server, or registry server. Further, monitoring server 20 may run, for example, an operating system, server-side system monitoring software, or a server-side software configuration management system, including but not limited to those mentioned above. Monitoring server 20 may be in communication with one or more computer systems 28-1-28-n, or other client electronic devices (i.e., client electronic devices 30, 32, 34.) Monitoring system 20 in communication with one or more computer systems (e.g., computer systems 28-1-28-n) will be discussed in conjunction with tree-sorting process 10 throughout this disclosure, however this discussion is also applicable to client electronic devices 30, 32, 34.

Computer systems 28-1-28-n may be clients of monitoring server 20, or may be any other computer systems in communication with monitoring server 20. Computer systems 28-1-28-n and monitoring server 20 may be on the same network, in the same distributed and/or host environment, or owned and/or used by the same entity (i.e., a corporation). Computer systems 28-1-28-n may also be servers, including but not limited to, any type of server discussed above. In one embodiment, any one of computer systems 28-1-28-n may be the monitoring server itself. Computer systems 28-1-28-n may be any computer systems that an administrator of a network or other group of computers may have an interest in for systems administration purposes.

Further, computer systems 28-1-28-n may have any number of attributes 202. These attributes may be monitored by tree-sorting process 10 and may include, but are not limited to, hardware attributes, software attributes (including operating system (OS) critical information), geographic attributes, and/or site attributes. More specifically, attributes 202 may include, but are not limited to, OS type, OS version, patch version, software installed, software versions, software settings, installation dates and times, online status, server type, processes running, user-access information, client-access information, database type, database software running, location, site, processor speed, memory installed, memory usage, disk space available, devices installed, device characteristics, or chipset types. Server-side tree-sorting process 10 may also dynamically monitor attributes 202 of computer systems 28-1-28-n. In other words, values of attributes 202 may be known by server-side tree-sorting process 10 and/or monitoring server 20 as they change, in real-time.

Referring now to FIGS. 1-4, graphical user interface 200 may be rendered, at least in part, by server-side tree-sorting process 10 via monitoring server 20. For example, if a user selects tree sorting options button 302 from tree 300. One or more selectable attributes 204 of computer systems 28-1-28-n monitored by monitoring server 20 may be displayed 102 in graphical user interface 200. It should be noted that the flowchart showing operations of server-side tree-sorting process 10 in FIG. 2 is shown for exemplary purposes only, and that the operations represented by the blocks in FIG. 2 may be performed in the order as shown, or in many other sequences as will be appreciated by those of ordinary skill in the art.

Figure 3:
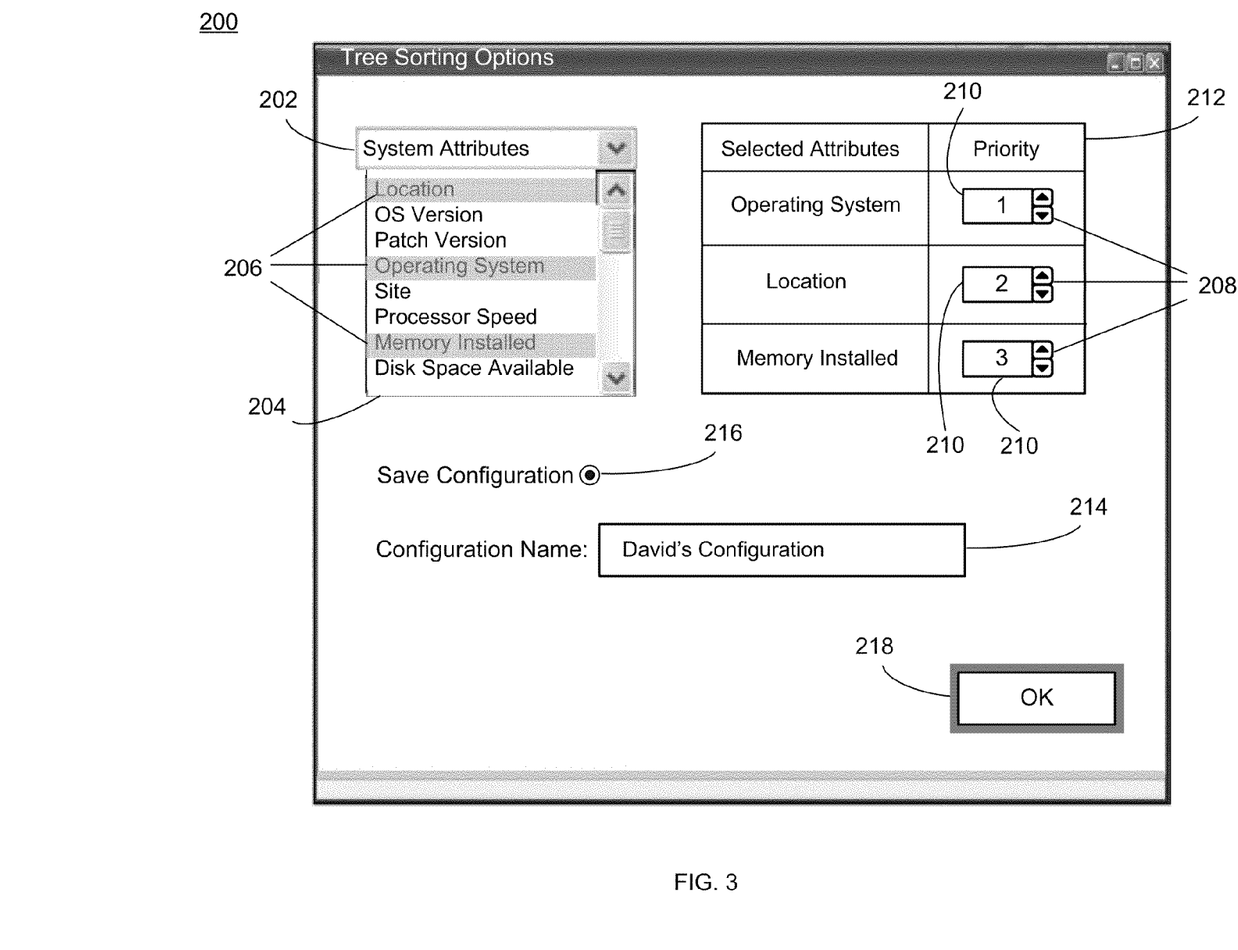
FIG. 3 is a diagrammatic view of a graphical user interface rendered, at least in part, by the tree-sorting process of FIG. 1.

The list of selectable attributes (e.g. selectable attributes 204) shown in FIG. 3 are shown for illustrative purposes only and are not exhaustive. Any number of selectable attributes may be monitored by tree-sorting process 10 via monitoring server 20 and may be shown in graphical user interface 200, including but not limited to, the attributes mentioned above. Further, the format and configuration of graphical user interface 200 shown in FIG. 3 is one particular example in one particular embodiment. In accordance with the present disclosure, graphical user interface 200 may have a variety of formats and configurations. For example, while graphical user interface 200 includes a dropdown list showing selectable attributes 204, the attributes monitored by server-side tree-sorting process 10 via monitoring server 20 which may be selectable by the user may be shown and may be selectable using a variety of user interface control elements. These user interface control elements may include, but are not limited to, check boxes, combo boxes, drop-down lists, grid views, list boxes, radio buttons, scrollbars, sliders, spinners, and, text boxes or any combination thereof.

Server-side tree-sorting process 10 may sort 104 computer systems 28-1-28-n in tree 300 based upon, at least in part, one or more selected attributes 206 of computer systems 28-1-28-n, which may be monitored by monitoring server 20. Selected attributes 206 shown in FIG. 3 are shown as an example only—any number of selectable attributes 204 may be selected by the user. As shown in the example of FIG. 3, the user may select the attributes "Location", "Operating System", and "Memory Installed" via a drop-down list in graphical user interface 200. Since server-side tree-sorting process 10 may monitor, via monitoring server 20, selectable attributes 204, server-side tree sorting process 10 and/or monitoring server 20 may input the values of selected attributes 206 in a table and/or chart stored in a memory (e.g., storage device 24). An example of values which may correspond to selected attributes 206 for computer systems 28-1-28-n is shown in Table 1 below:

TABLE 1

| | Location | Operating System | Memory Installed |
|---|---|---|---|
| Computer System 28-1 (David) | Boston | Windows 2000 | 4 GB |
| Computer System 28-2 (Tao) | New York | Unix | 2 GB |
| Computer System 28-3 (Timothy) | New York | Windows 2000 | 2 GB |
| Computer System 28-4 (Masabumi) | Boston | Linux | 2 GB |
| Computer System 28-5 (James) | Los Angeles | Unix | 4 GB |
| Computer System 28-n (Jennifer) | Los Angeles | Linux | 2 GB |

The values shown in the table above are for illustrative purposes only, and the attributes "Location", "Operating System", and "Memory Installed" may have any number of values for computer systems 28-1-28-n. Server-side tree-sorting process 10 may sort 104 computer systems 28-1-28-n in tree 300 based upon, at least in part, the values of selected attributes 206 as shown in Table 1 above. As shown in FIG. 4, tree 300 may be viewable to the user. Computer systems 28-1-28-n have been given names (shown in parenthesis in Table 1 above) for illustrative purposes only in order to clearly show how server-side tree-sorting process 10 may sort the computer systems in the tree (e.g., tree 300). Server-side tree-sorting process 10 may display system names or host names in the tree to represent the computer systems, such as computer system 28-1 (David), computer system 28-2 (Tao), computer system 28-3 (Timothy), computer system 28-4 (Masabumi), computer system 28-5 (James), and computer system 28-n (Jennifer). Server-side tree-sorting process 10 may sort tree 300 first by "Location", then by "Operating System", and then by "Memory Installed". Server-side tree-sorting process 10 may sort 104 tree 300 after the user selects "OK" button 218 on graphical user interface 200 as shown in FIG. 3. Further, server-side tree-sorting process 10 may sort 104 tree 300 dynamically, as the user selects selectable attributes 204, or as server-side tree-sorting process 10 is otherwise executed.

Referring now to FIG. 4, once server-side tree-sorting process 10 sorts tree 300, the tree may show the hierarchy of computer systems 28-1-28-n based upon, at least in part, the values of selected attributes 206 as shown in table 1. For example, since the user selected "Location", "Operating System", and "Memory Installed" as the attributes by which to sort computer systems 28-1-28-n, computer systems located in Boston (computer system 28-4 (Masabumi) and computer system 28-1 (David)) are shown highest on tree 300. Unless otherwise specified (as will be discussed below) server-side tree-sorting process 10 may arrange the computer systems in tree 300 first by "Location", next by "Operating System", and then by "Memory Installed". Also, unless otherwise specified (via a control not shown), server-side tree-sorting process 10 may sort by "Location" and "Operating System" of the computer systems in alphabetical order, respectfully, and "Memory Installed" of the computer systems in numerical order. As such, tree 300 shown in FIG. 4, and sorted based upon selected attributes 206 having values as shown in Table 1, may list Boston-based systems Masabumi and David first, Los Angeles-based systems Jennifer and James next, and New York-based systems Tao and Timothy last.

In one embodiment, server-side tree-sorting process 10 may generate 110 code, via monitoring server 20, to sort computer systems 28-1-28-n in tree 300 based upon, at least in part, at least one of selected attributes 206 of computer systems 28-1-28-n monitored by monitoring server 20. Server-side tree-sorting process 10 may use any type of automatic programming or generative programming to create code through generic frames or templates in order to sort tree 300 based upon selected attributes 206. For example, server-side tree sorting process 10 may include templates or snippets of source code that, when executed, sort tree 300 based upon one or more hard-coded attributes. Further, server-side tree sorting process 10 may use these templates or snippets to generate code to sort tree 300 based upon, at least in part, selected attributes 206, or any combination of one or more attributes selected by the user in graphical user interface 200.

Referring now to FIGS. 1-5, in another embodiment, server-side tree-sorting process 10 may display 106, via graphical user interface 200, one or more definable priority levels 208 for one or more selected attributes 206 of computer systems 28-1-28-n monitored by monitoring server 20. For example, the user may wish to prioritize the way in which computer systems 28-1-28-n are sorted in the tree (e.g., tree 400). As shown in FIG. 3, the user may wish to sort first by "Operating System", then by "Location", and next by "Memory Installed". The user may define priority levels 210 for selected attributes 206 using the user interface control elements shown in FIG. 3 or any other user interface control elements which may be used in graphical user interface 200, such as those mentioned above. After the user defines priority levels 210 for selected attributes 206, server-side tree-sorting process 10 may include the priority levels in a table and/or chart or memory (e.g., storage device 24). The priority levels may correspond to selected attributes 206 and computer systems 28-1-28-1. An example of the table of values and priority levels which may correspond to selected attributes 206 for computer systems 28-1-28-n is shown in Table 2 below:

TABLE 2

|  | Location | Operating System | Memory Installed |
|---|---|---|---|
| Computer System 28-1 (David) | Boston | Windows 2000 | 4 GB |
| Computer System 28-2 (Tao) | New York | Unix | 2 GB |
| Computer System 28-3 (Timothy) | New York | Windows 2000 | 2 GB |
| Computer System 28-4 (Masabumi) | Boston | Linux | 2 GB |
| Computer System 28-5 (James) | Los Angeles | Unix | 4 GB |
| Computer System 28-n (Jennifer) | Los Angeles | Linux | 2 GB |
| Priority Level | 2 | 1 | 3 |

Figure 5:
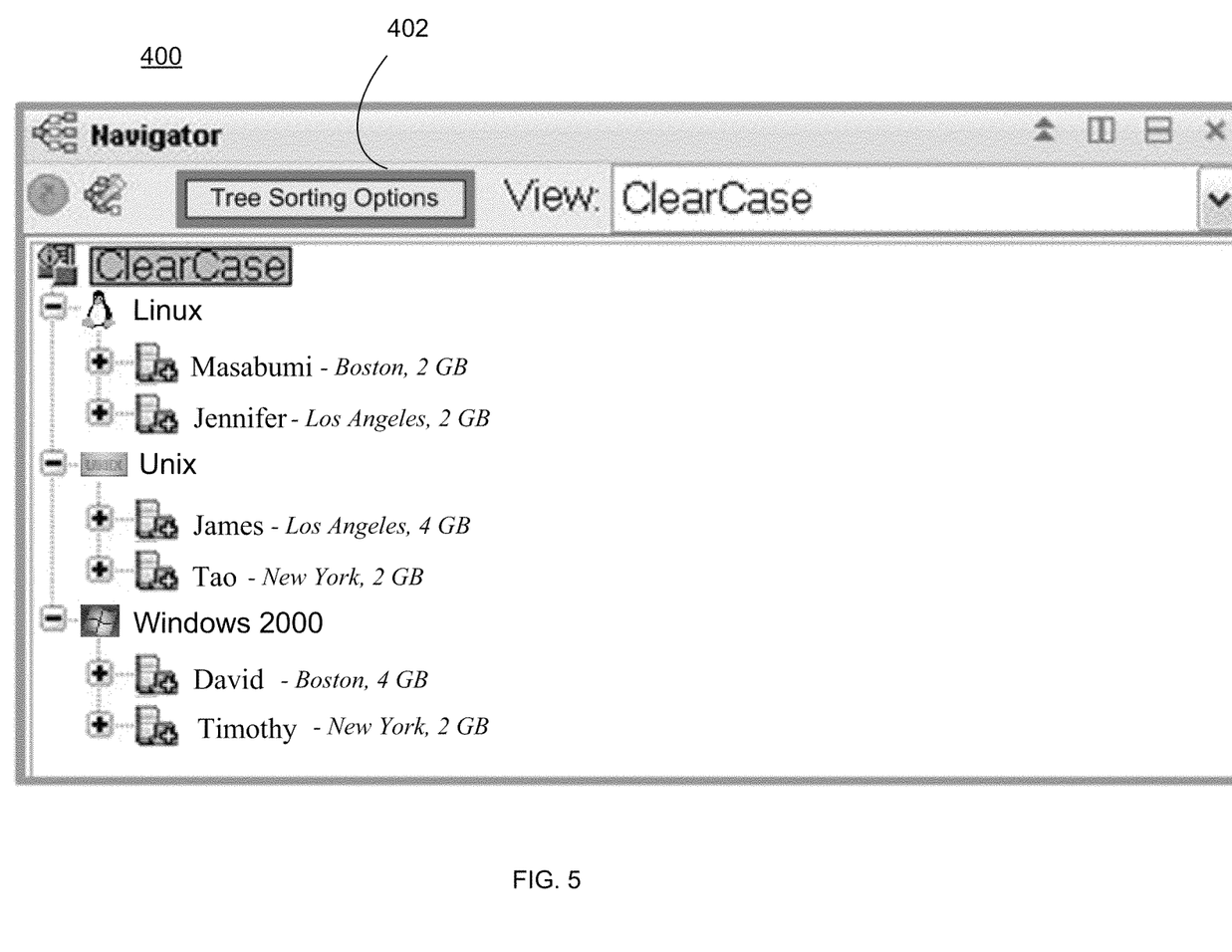
FIG. 5 is a diagrammatic view of a tree rendered, at least in part, by the tree-sorting process of FIG. 1.

Continuing with the above example server-side tree-sorting process 10 may sort 108 computer systems 28-1-28-n in tree 400 based upon, at least in part, one or more defined priority levels 210 of one or more selected attributes 206 of computer systems 28-1-28-n monitored by the monitoring server 20. Server-side tree-sorting process 10 may create Table 2 and/or add defined priority levels 210 to table 1, and may sort tree 400, after the user selects "OK" button 218 on graphical user interface 200 as shown in FIG. 3. Further, server-side tree-sorting process 10 may sort 108 tree 400 dynamically, as the user selects selectable attributes 204, and/or as server-side tree-sorting process 10 is otherwise executed.

Referring now to FIG. 5, once server-side tree-sorting process 10 sorts tree 400, the tree may show the hierarchy of computer systems 28-1-28-n based upon, at least in part, defined priority levels 210 of selected attributes 206 having values as shown in Table 2. For example, since the user selected "Location", "Operating System", and "Memory Installed" as the attributes by which to sort computer systems 28-1-28-n, and defined priority levels as 1 for "Operating System", 2 for "Location", and 3 for "Memory Installed", computer systems running the Linux operating system (computer System 28-4 (Masabumi) and computer System 28-n (Jennifer)) are shown highest on tree 400. According to the user defined priority levels as shown in Table 2 above, server-side tree-sorting process 10 may arrange the computer systems in tree 400 first by "Operating System", next by "Location", and then by "Memory Installed". Also, unless otherwise specified (via a control not shown), server-side tree-sorting process 10 may sort "Operating System" and "Location" of the computer systems in alphabetical order, respectfully, and "Memory Installed" of the computer systems in numerical order. As such, tree 400 shown in FIG. 5, sorted based upon defined priority levels 210 of selected attributes 206 having values as shown in Table 2, may list Linux-based systems Masabumi and Jennifer first, Unix-based systems James and Tao next, and Windows 2000-based systems David and Timothy last.

Figure 6:
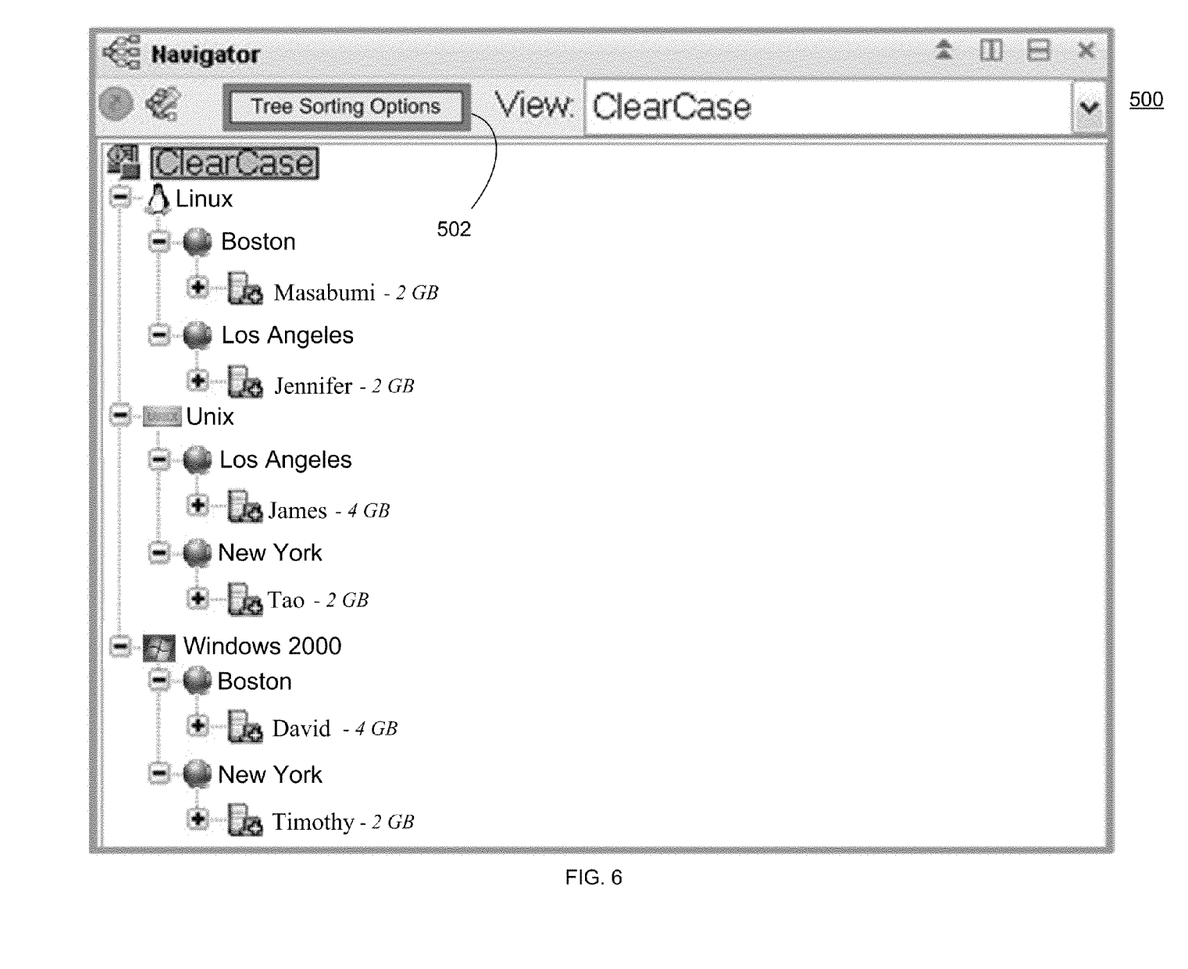
FIG. 6 is a diagrammatic view of a tree rendered, at least in part, by the tree-sorting process of FIG. 1.

In another embodiment server-side tree-sorting process 10 may sort tree 500 to show a multiple level grouping. For example, and referring to FIG. 6 and Table 2, tree 500 shows a parent node signifying "Operating System" (e.g., Linux), and then a child node below signifying "Location" (e.g., Boston). While tree 500 may show similar information to tree 400 of FIG. 5 regarding the hierarchy of computer systems 28-1-28-n, and may relay similar information regarding Table 2, tree 500 includes the multiple level grouping feature. In some embodiments, tree 500 may include another grouping level, under "Location", to signify "Memory Installed". The multiple level grouping feature may provide users viewing trees with many more computer systems, defined priorities, and/or selected attributes than trees 300-500 with a better picture of the overall network and/or deployment. Users may select to view a multiple level grouping by selecting tree sorting options button 502. Selection of tree sorting options button 502 may bring up a graphical user interface similar to that of graphical user interface 200, allowing the user to select a multiple level grouping option. Tree 500 may show any number of grouping levels as designated by the user, or based upon, at least in part, the number of defined priority levels and/or selected attributes. Tree 500 may be configured to automatically include multiple level grouping, without user selection of a multiple level grouping feature.

Continuing further with the above example, server-side tree-sorting process 10 may generate 112 code, via monitoring server 20, to sort computer systems 28-1-28-$n$ in tree 400 based upon, at least in part, defined priority levels 210 of at least one of selected attributes 206 of computer systems 28-1-28-$n$ monitored by monitoring server 20. Server-side tree-sorting process 10 may use any type of automatic programming or generative programming to create code through, for example, generic frames or templates in order to sort tree 400 based upon defined priority levels 210 and selected attributes 206. For example, server-side tree sorting process 10 may include templates or snippets of source code that, when executed, sort tree 400 based upon one or more hard-coded priority levels and attributes. Further, server-side tree sorting process 10 may use these templates or snippets to generate code to sort tree 400 based upon, at least in part, defined priority levels 210 and selected attributes 206, or any combination of defined priority levels and attributes selected by the user in graphical user interface 200.

Referring back to FIG. 3, server-side tree-sorting process 10 may save 114 sorting configuration 212 of one or more defined priority levels 210 of one or more selected attributes 206 of computer systems 28-1-28-$n$ monitored by monitoring server 20. In some instances the user may use multiple sorting configurations to sort the tree (e.g., tree 300 or tree 400) at various times and may wish to save these configurations so they may be easily reused. In one embodiment, the user may select save configuration radio button 216 in order to save sorting configuration 212 in graphical user interface 200. Radio button 216 is shown for exemplary purposes only and a number of different user interface control elements may be used to allow the user to save sorting configurations, such as those mentioned above. Upon selecting save configuration radio button 216, the user may enter, or may be prompted to enter a sorting configuration name in text box 214. Text box 214 is shown for exemplary purposes only, and the user may enter a name for sorting configuration 212 in a variety of ways. For example, a popup window may be rendered by, at least in part, server-side tree-sorting process 10 upon the user's selection of radio button 216, allowing the user to enter a name for sorting configuration 212. As shown in FIG. 3, the user has entered the name "David's Configuration" in text box 214 as the name under which sorting configuration 212 will be saved.

Continuing with the above example, server-side tree-sorting process 10 may save sorting configuration 212 upon selection of "OK" button 218 by the user. Once the user selects "OK" button 218 or otherwise executes server-side tree-sorting process 10 after electing to save sorting configuration 212, server-side tree-sorting process 10 may save Table 2 in a memory (e.g., storage device 24). If the user wishes to use sorting configuration 212, or "David's Configuration" in the future, the user may open or otherwise select "David's Configuration" from a menu or graphical user interface (not shown). Upon selection of "David's Configuration", server-side tree-sorting process 10 may sort the tree (e.g., tree 300 or tree 400) based upon, at least in part, the saved sorting configuration (e.g., sorting configuration 212, or "David's Configuration") selected by the user. This allows the user to save and use or reuse one or more sorting configurations (e.g., sorting configuration 212) to sort 116 computer systems 28-1-28-$n$ in the tree (e.g., tree 300 or 400) based upon, at least in part, the saved sorting configuration (e.g., sorting configuration 212).

In some embodiments, server-side tree-sorting process 10 may update 120 the tree (e.g., tree 300 or tree 400) based upon, at least in part, changes in selected attributes 206 of computer systems 28-1-28-$n$. Server-side tree-sorting process 10 may dynamically monitor, via monitoring server 20, attributes 202 allowing server-side tree-sorting process 10 to have the latest values of attributes 202 and therefore selected attributes 206. In this way, server-side tree-sorting process 10 is aware of any changes to selected attributes 206 and can update the tree (e.g., tree 300 or tree 400) accordingly. As values of selected attributes 206 change, server-side tree-sorting process 10 may update the tables (e.g., table 1 or table 2) and store values of the selected attributes (e.g., selected attributes 206) in a memory (e.g., storage device 24).

Referring back to FIGS. 1-3, one way server-side tree-sorting process 10 may update the tree based upon changes in selected attributes 206 is to monitor 118 events (e.g., event 62) triggered by changes in selected attributes 206 of computer systems 28-1-28-$n$. For example, computer systems 28-1-28-$n$ may send events (e.g., event 62) out to other systems (e.g., monitoring server 20) on a network (e.g., networks 22 and 26) when attributes (e.g., selected attributes 206) have a change in value. If, for example, computer system 28-1 (David) is changed from a Windows 2000 operating system to a Unix operating system, computer system 28-1 may send an event (e.g., event 62) to other systems (e.g., monitoring system 20) on a network in order to notify those systems of the change. Server-side tree-sorting process 10 may receive this event and update the value for computer system 28-1 (David) in the table (e.g., table 1 or table 2). Further, server-side tree-sorting process 10 may update 122 the tree (e.g., tree 300 or 400) based upon, at least in part, the events (e.g., event 62) monitored by monitoring server 20.

The event mechanism described above may be used to update or synchronize the tree (e.g., tree 300 or tree 400) as values of attributes change and also as systems are added or removed from the network and/or deployment. For example, server-side tree-sorting process 10 may listen for events on the network and/or deployment signifying that a system has been added or removed, or that a system's attribute has changed. Further, server-side tree-sorting process 10 may read the user selected attributes (e.g., selected attributes 206) and create a list of computer systems having those attributes. As discussed above, the attributes may be prioritized as defined by the user. If, for example, server-side tree-sorting process 10 receives an event signifying that a computer system is running a different operating system, server-side tree-sorting process 10 may query that computer system in order to find its operating system attribute value. Server-side tree-sorting process 10 may then use this information to update or synchronize the tree each time it receives an event.

Some of the embodiments described above may be implemented as software modules executed by a processor of a computing system, and/or in a computer program product that may be stored on a storage device, storage medium, or computer readable medium having instructions that when executed by a processor perform the tree-sorting processes described herein. The storage device, storage medium, or computer readable medium may include, but is not limited to, any type of disk including floppy disks, optical disks, compact disk read only memories (CD-ROMS), compact disk rewritables (CD-RWs), magneto-optical disks, semiconductor devices such as read-only memories (ROMs), random access memories (RAMs) such as dynamic and static RAMs, electronically erasable programmable read-only memories (EEPROMs), flash memories, magnetic or optical cards, or any type of media suitable for storing electronic instructions. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A computer-implemented method, comprising:
   automatically detecting a plurality of computer systems on a network;
   running a query against each of the plurality of computer systems to collect data associated with a plurality of attributes for each of the plurality of computer system included within the network;
   constructing a globally accessible hierarchical tree using the collected data associated with attributes of each of the plurality of computer systems;
   displaying, in a graphical user interface on a computer device, the plurality of attributes of the plurality of computer systems as selectable attributes;
   displaying, via the graphical user interface, one or more definable priority levels corresponding to one or more selected attributes of the computer systems;
   defining a table including a defined priority level corresponding to the one or more selected attributes for each of the plurality of computer systems; and
   sorting, dynamically, the plurality of computer systems in the tree in a multiple priorities level grouping based upon, at least in part, the defined priority levels corresponding to the one or more selected attributes for each of the plurality of computer systems, wherein each attribute of the one or more selected attributes corresponds to a respective definable and changeable priority level of the one or more definable priority levels.

2. The computer implemented method of claim 1, further comprising:
   generating code to sort the computer systems in the tree based upon, at least in part, at least one of the selected attributes of the computer systems.

3. The computer implemented method of claim 1, further comprising:
   generating code to sort the computer systems in the tree based upon, at least in part, at least one of the defined priority levels of at least one of the selected attributes of the computer systems.

4. The computer implemented method of claim 1, further comprising:
   saving a sorting configuration of the one or more defined priority levels of the one or more selected attributes of the computer systems; and
   sorting the computer systems in the tree based upon, at least in part, the saved sorting configuration.

5. The computer implemented method of claim 1, further comprising:
   updating the tree based upon, at least in part, changes in the selected attributes of the computer systems.

6. The computer implemented method of claim 1 further comprising:
   monitoring events triggered by changes in the selected attributes of the computer systems; and
   updating the tree based upon, at least in part, the events.

7. A computer program product residing on a non-transitory computer readable medium having a plurality of instructions stored thereon, which, when executed by a processor cause the processor to perform operations comprising:
   automatically detecting a plurality of computer systems on a network;
   running a query against each of the plurality of computer systems to collect data associated with a plurality of attributes for each of the plurality of computer system included within the network;
   constructing a globally accessible hierarchical tree using the collected data associated with attributes of each of the plurality of computer systems;
   displaying, in a graphical user interface, the plurality of attributes of the plurality of computer systems as selectable attributes;
   displaying, via the graphical user interface, one or more definable priority levels corresponding to one or more selected attributes of the computer systems;
   defining a table including a defined priority level corresponding to the one or more selected attributes for each of the plurality of computer systems; and
   sorting, dynamically, the plurality of computer systems in the tree in a multiple priorities level grouping based upon, at least in part, the defined priority levels corresponding to the one or more selected attributes for each of the plurality of computer systems, wherein each attribute of the one or more selected attributes corresponds to a respective definable and changeable priority level of the one or more definable priority levels.

8. The computer program product of claim 7 further comprising instructions for:
   generating code to sort the computer systems in the tree based upon, at least in part, at least one of the selected attributes of the computer systems.

9. The computer program product of claim 7 further comprising instructions for:
   generating code to sort the computer systems in the tree based upon, at least in part, at least one of the defined priority levels of at least one of the selected attributes of the computer systems.

10. The computer program product of claim 7 further comprising instructions for:
    saving a sorting configuration of the one or more defined priority levels of the one or more selected attributes of the computer systems; and
    sorting the computer systems in the tree based upon, at least in part, the saved sorting configuration.

11. The computer program product of claim 7 further comprising instructions for:
    updating the tree based upon, at least in part, changes in the selected attributes of the computer systems.

12. The computer program product of claim 7 further comprising instructions for:
    monitoring events triggered by changes in the selected attributes of the computer systems; and
    updating the tree based upon, at least in part, the events.

13. A computing system comprising:
    at least one processor;
    at least one memory architecture coupled with the at least one processor;

a first software module executed on the at least one processor and the at least one memory architecture, wherein the first software module is configured to automatically detect a plurality of computer systems on a network;

a second software module executed on the at least one processor and the at least one memory architecture, wherein the second software module is configured to run a query against each of the plurality of computer systems to collect data associated with a plurality of attributes for each of the plurality of computer system included within the network;

a third software module executed on the at least one processor and the at least one memory architecture, wherein the third software module is configured to construct a globally accessible hierarchical tree using the collected data associated with attributes of each of the plurality of computer systems;

a fourth software module executed on the at least one processor and the at least one memory architecture, wherein the fourth software module is configured to display, in a graphical user interface, the plurality of attributes of the plurality of computer systems as selectable attributes;

a fifth software module executed on the at least one processor and the at least one memory architecture, wherein the fifth software module is configured to display, via the graphical user interface, one or more definable priority levels corresponding to one or more selected attributes of the computer systems;

a sixth software module executed on the at least one processor and the at least one memory architecture, wherein the sixth software module is configured to define a table including a defined priority level corresponding to the one or more selected attributes for each of the plurality of computer systems; and a seventh software module executed on the at least one processor and the at least one memory architecture, wherein the seventh software module is configured to sort, dynamically, the plurality of computer systems in the tree in a multiple priorities level grouping based upon, at least in part, the defined priority levels corresponding to the one or more selected attributes for each of the plurality of computer systems, wherein each attribute of the one or more selected attributes corresponds to a respective definable and changeable priority level of the one or more definable priority levels.

14. The computing system of claim 13 further comprising:
an eighth software module configured to generate code to sort the computer systems in the tree based upon, at least in part, at least one of the selected attributes of the computer systems.

15. The computing system of claim 13 further comprising:
a ninth software module configured to generate code to sort the computer systems in the tree based upon, at least in part, at least one of the defined priority levels of at least one of the selected attributes of the computer systems.

16. The computing system of claim 13 further comprising:
a tenth software module configured to save a sorting configuration of the one or more defined priority levels of the one or more selected attributes of the computer systems; and
an eleventh software module configured to sort the computer systems in the tree based upon, at least in part, the saved sorting configuration.

17. The computing system of claim 13 further comprising:
a twelfth software module configured to update the tree based upon, at least in part, changes in the selected attributes of the computer systems.

18. The computer implemented method of claim 1, wherein at least one of the one or more selected attributes of the computer systems and upon which the sorting of the computer systems in the tree are based is a hardware attribute of the computer systems, the hardware attribute being at least one of: processor speed, memory installed, memory usage, disk space available, a device installed, a device characteristic, server type, and chipset type.

19. The computer implemented method of claim 1, wherein at least one of the one or more selected attributes of the computer systems and upon which the sorting of the computer systems in the tree are based is a software attribute of the computer systems, the software attribute being at least one of: OS type, OS version, patch version, software installed, a software version, a software setting, an installation date, an installation time, online status, a processes running, user-access information, client-access information, database type, and database software running.

20. The computer implemented method of claim 1, wherein at least one of the one or more selected attributes of the computer systems and upon which the sorting of the computer systems in the tree are based is a hardware attribute of the computer systems, wherein at least one of the one or more selected attributes of the computer systems and upon which the sorting of the computer systems in the tree are based is a software attribute of the computer systems, wherein one or more of the defined priority levels corresponding to the one or more selected attributes of the computer systems corresponds to the hardware attribute of the computer systems, and wherein one or more of the defined priority levels corresponding to the one or more selected attributes of the computer systems corresponds to the software attribute of the computer systems.

* * * * *